United States Patent
Murdock et al.

[11] Patent Number: 6,111,913
[45] Date of Patent: Aug. 29, 2000

[54] MACROBLOCK BIT REGULATION SCHEMES FOR VIDEO ENCODER

[75] Inventors: John Ashley Murdock, Apalachin; Agnes Yee Ngai, Endwell; Stephen Philip Pokrinchak, Owego, all of N.Y.

[73] Assignee: International Business Machines Corporation, Armonk, N.Y.

[21] Appl. No.: 08/859,544

[22] Filed: May 20, 1997

[51] Int. Cl.$^7$ ................................ H04N 7/30
[52] U.S. Cl. .................. 375/240; 348/405; 348/420
[58] Field of Search .............. 348/390, 400–403, 348/405, 409–413, 415, 416, 419, 420, 699; 382/232, 236, 238, 248, 250, 251; 375/240; H04N 7/30

[56] References Cited

U.S. PATENT DOCUMENTS

| | | | |
|---|---|---|---|
| 5,311,310 | 5/1994 | Jozawa et al. | 348/416 |
| 5,379,356 | 1/1995 | Purcell et al. | 382/56 |
| 5,493,513 | 2/1996 | Keith et al. | 364/514 R |
| 5,526,054 | 6/1996 | Greenfield et al. | 348/403 |
| 5,644,504 | 7/1997 | Boice et al. | 348/409 |
| 5,748,240 | 5/1998 | Carr et al. | 348/403 |
| 5,768,537 | 6/1998 | Butter et al. | 348/416 |
| 5,870,144 | 2/1999 | Guerrera | 348/403 |
| 5,872,598 | 2/1999 | Legall et al. | 348/405 |
| 5,905,815 | 5/1999 | Mack et al. | 348/403 |
| 5,929,916 | 7/1999 | Legall et al. | 348/405 |
| 5,936,673 | 8/1999 | Agarwal | 348/420 |

*Primary Examiner*—Richard Lee
*Attorney, Agent, or Firm*—Heslin & Rothenberg, P.C.; William H. Steinberg, Esq.

[57] ABSTRACT

An MPEG2 compliant digital video encoder system employs an I-frame video encoder module having a quantization unit and variable length encoding to encode coefficients of each macroblock of a picture. Bit regulation schemes are presented for constraining selected coefficients of a macroblock if the bit rate of two prior macroblocks in a row exceeded a bit rate limit, or if the bit rate of the current nonintra macroblock is greater than a predetermined megabits per second (Mbps) limit. Pattern constraining is implemented within the quantization unit. For nonintra pictures, the conventional variable length coding process is modified to generate a Fixed Coded Block Pattern (FCBP) header for each macroblock of the picture for outputting in the bitstream prior to coding of the coefficients. The FCBP signifies that each block of the macroblock contains at least one nonzero coefficient. The regulation scheme then ensures that each block of the macroblock includes at least one nonzero coefficient by setting one of the coefficients in an all zeros block to a nonzero value.

29 Claims, 12 Drawing Sheets

| | | | | | | | |
|---|---|---|---|---|---|---|---|
| DC | AC | AC | AC | AC | AC | AC | AC |
| AC | AC | AC | AC | AC | AC | AC | O |
| AC | AC | AC | AC | AC | AC | O | O |
| AC | AC | AC | AC | AC | O | O | O |
| AC | AC | AC | AC | O | O | O | O |
| AC | AC | AC | O | O | O | O | O |
| AC | AC | O | O | O | O | O | O |
| AC | O | O | O | O | O | O | O |

*fig. 9*

| | | | | | | | |
|---|---|---|---|---|---|---|---|
| O | O | O | O | O | O | O | O |
| O | O | O | O | O | O | O | O |
| O | O | O | O | O | O | O | O |
| O | O | O | O | O | O | O | O |
| O | O | O | O | O | O | O | O |
| O | O | O | O | O | O | O | O |
| O | O | O | O | O | O | O | O |
| O | O | O | O | O | O | O | AC |

*fig. 15*

STANDARD CONSTRAINING PATTERN
{
```
AC AC AC AC AC AC AC AC
AC AC AC AC AC AC AC  0
AC AC AC AC AC AC  0   0
AC AC AC AC AC  0   0   0
AC AC AC AC  0   0   0   0
AC AC AC  0   0   0   0   0
AC AC  0   0   0   0   0   0
AC  0   0   0   0   0   0   0
```

*fig. 10*

HIGHER BITRATE CONSTRAINING PATTERN
{
```
AC AC AC AC AC AC AC AC
AC AC AC AC AC AC AC AC
AC AC AC AC AC AC AC AC
AC AC AC AC AC AC AC AC
AC AC AC AC AC AC AC  0
AC AC AC AC AC AC  0   0
AC AC AC AC AC  0   0   0
AC AC AC AC  0   0   0   0
```

*fig. 11*

LOWER BITRATE CONSTRAINING PATTERN
{
```
AC AC AC AC  0   0   0   0
AC AC AC  0   0   0   0   0
AC AC  0   0   0   0   0   0
AC  0   0   0   0   0   0   0
 0   0   0   0   0   0   0   0
 0   0   0   0   0   0   0   0
 0   0   0   0   0   0   0   0
 0   0   0   0   0   0   0   0
```

*fig. 12*

MACROBLOCK BIT REGULATION SCHEMES FOR VIDEO ENCODER

TECHNICAL FIELD

This invention relates in general to an apparatus and method for encoding digital visual images including spatial (intra-picture) and temporal (inter-picture) compression, that is reducing both redundancy within a picture and redundancy between pictures. Redundancy within pictures is reduced, or even eliminated, by the use of the discrete cosine transform, quantitization, and variable length encoding. Redundancy between pictures is reduced, or even eliminated, through the use of motion vectors. One aspect of intra-picture compression comprises bit regulation to achieve an optimized bit rate while still maintaining picture quality and detail. This invention is specifically directed to enhanced macroblock bit regulation schemes for the quantitization and variable length encoding functions of the video encoder.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, variable length coding, and Huffman coding. Video compression between pictures is accomplished via a process referred to as motion estimation, in which a motion vector plus difference data is used to describe the translation of a set of picture elements (pels) from one picture to another.

The ISO MPEG2 standard specifies only the syntax of bitstream and semantics of the decoding process. The choice of coding parameters and tradeoffs in performance versus complexity are left to the encoder developers.

One aspect of the MPEG2 compliant encoding process is compressing a digital video image into as small a bitstream as possible while still maintaining video detail and quality. The MPEG standard places limitations on the size of the bitstream, and requires that the encoder be able to perform the encoding process. Thus, simply optimizing the bit rate to maintain desired picture quality and detail can be difficult. For example, the MPEG standard requires that no more than two macroblocks in each horizontal row of a picture exceed the bit rate limitation, which for a 4:2:0 format is 4608 bits. In the case of scene changes and action videos, the bit rate can be quickly consumed with drastic changes between frames. Picture quality and detail can suffer as a result.

Another aspect of the MPEG2 compliant encoding process is a performance issue arising at the compressed store interface with encoding of nonintra macroblocks. This issue stems from the fact that the coded block pattern, which is part of the macroblock header and required by MPEG standard, cannot be determined until after all quantized coefficients of a macroblock are variable-length encoded. While waiting for the coded block pattern, the compressed store interface must buffer the coefficients to ensure that the macroblock header for the current macroblock is multiplexed into the compressed bitstream before the encoded coefficients to be output from the encoder. Again, this is needed to comply with the MPEG standard. Intra macroblocks do not require coefficients to be buffered because intra macroblocks necessarily contain data and thus do not have coded block patterns. The amount of encoded coefficient data in a nonintra macroblock will affect encoder performance because of the time needed to read the data from the buffer and multiplex it into the compressed bitstream.

The present invention presents macroblock bit regulation schemes for the video encoder which address the above-summarized problems inherent in the standard quantitization, variable length encoding and compressed store interface processings.

SUMMARY OF THE INVENTION

Briefly described, the invention comprises in a first aspect a method and apparatus for encoding a picture having multiple rows, each row containing multiple macroblocks. Each macroblock has multiple coefficients arranged in a plurality of blocks. The inventive approach includes for each macroblock in each row: determining whether n prior macroblocks in the row exceeded a bit rate limit, wherein n is a predetermined number; encoding the macroblock; and if n prior macroblocks in the row have exceeded the bit rate limit, then applying a constraining pattern to the macroblock. The constraining pattern zeros selected coefficients of the macroblock to reduce the bit rate of the macroblock. Numerous enhancements to the basic concept outlined above are also provided.

In another aspect, the invention comprises a method/apparatus for encoding a picture having a plurality of macroblocks, each macroblock again containing multiple coefficients. This method/apparatus comprises for each macroblock: encoding the coefficients of the macroblock; determining a target bit rate for the macroblock; and if the target bit rate is less than x megabits per second, wherein x is a predetermined number, then applying a constraining pattern to the coefficients to zero selected coefficients of the macroblock.

In still another aspect, the invention comprises a method/apparatus for encoding a nonintra macroblock of a picture having a plurality of macroblocks, each macroblock containing coefficients arranged in multiple blocks. The method includes: generating a Fixed Coded Block Pattern (FCBP) header for the macroblock and outputting the FCBP in a bitstream, the FCBP signifying that each block of the macroblock contains at least one nonzero coefficient; and subsequently ensuring that each block of the macroblock contains at least one nonzero coefficient.

To restate, presented herein are several macroblock bit regulation schemes which can be used to enhance quantization and variable length encoding of the video encoder. By selectively, partially constraining coefficients in a macroblock, bit rate regulation is achieved and an improved balancing of bit rate and picture quality is obtained. For example, setting a constrain pattern to zero out high frequency coefficients, allows more bits to be allocated for the low frequency coefficients. A finer mquant can then be used to capture more picture details. Pattern constraining can be applied to all macroblocks or to only nonintra macroblocks. A wide range of partial constrain patterns are possible.

Performance can also be enhanced by fixing (predetermining) the Coded Block Pattern defined by MPEG standard as output from the variable length encoder. By predetermining the Coded Block Pattern an entire macroblock's worth of variable length encoded data need not be buffered at the compressed store interface. This works particularly well at higher bit rates since the likelihood of having blocks that are not coded is small.

In the case of low bit rate macroblocks, pattern constraining reduces the overall size of the macroblock, and therefore the amount of data that the compressed store interface would need to buffer and subsequently read out is also reduced. This would not eliminate the need for the compressed store interface to buffer nonintra macroblocks with low bit rate, but it does improve performance.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIG. 9 depicts one selective constrain pattern in accordance with the present invention wherein lower frequency coefficients are maintained, and higher frequency coefficients are zeroed out.

FIG. 10 depicts a standard constraining pattern in accordance with the present invention similar to that of FIG. 9.

FIG. 11 depicts a constraining pattern for a higher bit rate wherein less higher frequency coefficients are zeroed out.

FIG. 12 depicts a constrain pattern for lower bit rate processing wherein a greater number of coefficients are zeroed out. Again, the lowest frequency coefficients are maintained.

FIG. 15 depicts one embodiment of an all zero block modified to include a nonzero coefficient in the $64^{th}$ position of the 8×8 array of coefficients.

BEST MODE FOR CARRYING OUT THE INVENTION

Figure 1:
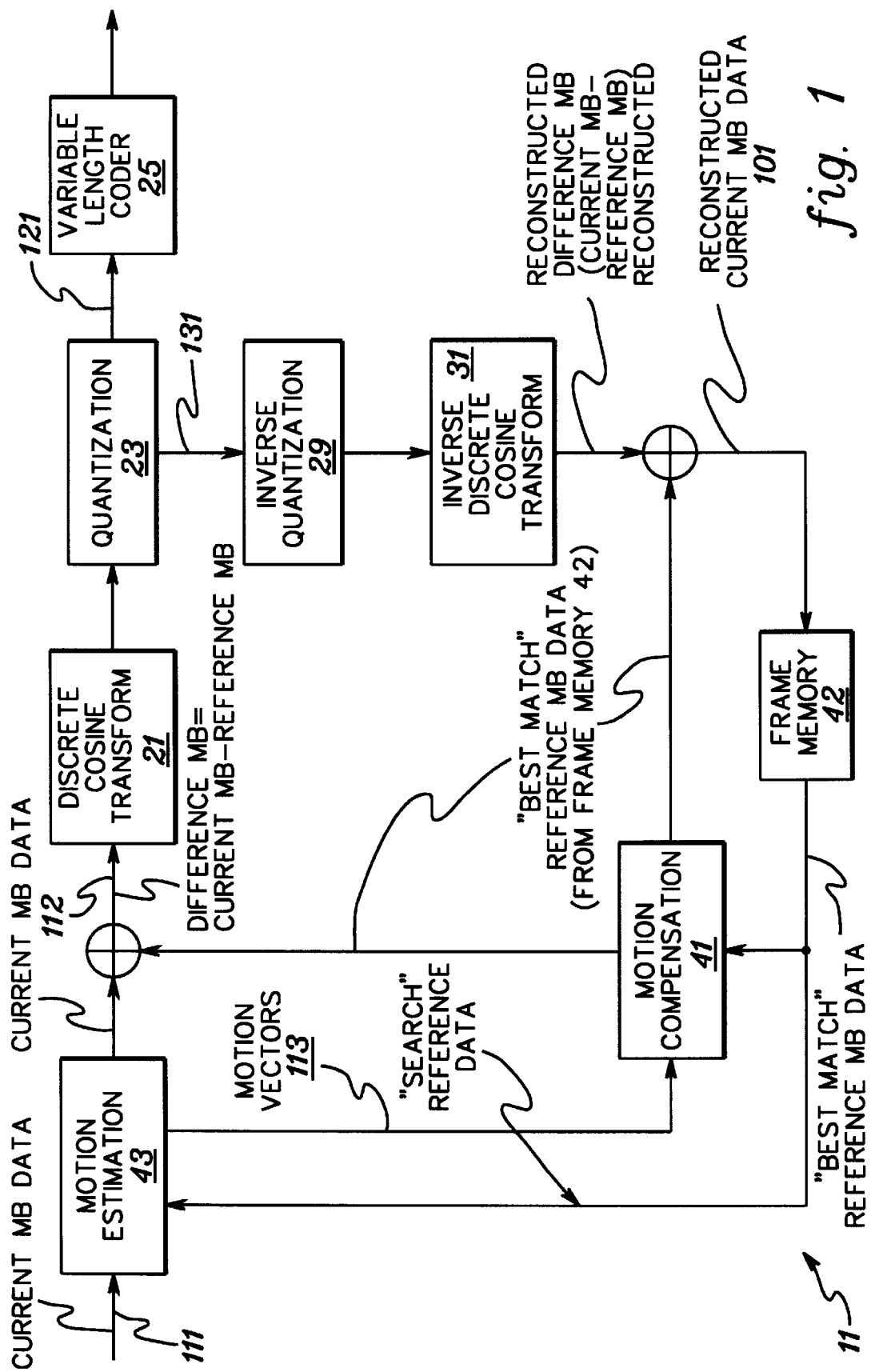
FIG. 1 shows a flow diagram of a generalized MPEG2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113, the picture output 121, the feedback picture for motion estimation and compensation 131, and the reconstructed picture 101. This figure has the assumptions that the $i^{th}$ picture exists in Frame Memory or Frame Store 42, and that the $i+1^{th}$ picture is being encoded with motion estimation.

The invention relates to scalable MPEG and HDTV compliant encoders and encoding processes. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are the temporal compression functions. Spatial and temporal compression are repetitive functions with high computational requirements.

More particularly the invention relates to a processor for performing spatial and temporal compression including discrete cosine transformation, quantization, entropy encoding, motion estimation, motion compensation, and prediction, and even more particularly to a system for accomplishing spatial and temporal compression.

The scalable processor system has an I-frame only video encoder module with a Discrete Cosine Transform processor, a quantization unit, a variable length encoder, a FIFO buffer, and a compressed store interface. The system also includes a second processor element, that is, an R-processor or Reconstruction processor with a reference memory interface, motion estimation and compensation capability, inverse quantization, and inverse discrete cosine transformation, and motion compensation means; and at least one third processor element motion estimation. The system can be in the form of a single integrated circuit chip, or a plurality of integrated circuit chips, that is one for each processor, the I-frame video encoder module, the second processor element, and the third processor element. There can be one or more of the third processor units.

The first compression step is the elimination of spatial redundancy, for example, the elimination of spatial redundancy in a still picture of an "I" frame picture. Spatial redundancy is the redundancy within a picture. Because of the block based nature of the motion compensation process, described below, it was desirable for the MPEG-2 Draft Standard to use a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression.

The Discrete Cosine Transformation is an orthogonal transformation. Orthogonal transformations, because they have a frequency domain interpretation, are filter bank oriented. The Discrete Cosine Transformation is also localized. That is, the encoding process samples on an 8×8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

After transformation, many of the frequency coefficients are zero, especially the coefficients for high spatial frequencies. These coefficients are organized into a zig-zag pattern, and converted into run-amplitude (run-level) pairs. Each pair indicates the number of zero coefficients and the amplitude of the non-zero coefficient. This is coded in a Variable Length Code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the Motion Estimation unit 43 of the encoder. Motion vectors 113 are formed as the output of the Motion Estimation unit 43. These vectors are used by the Motion Compensation Unit 41 to retrieve macroblock data from previous and/or future pictures, referred to as "reference" data, for output by this unit. One output of the Motion Compensation Unit 41 is negatively summed with the output from the Motion Estimation unit 43 and the difference MB 112 goes to the input of the Discrete Cosine Transformer 21. The output of the Discrete Cosine Transformer 21 is quantized in a Quantizer 23. The output of the Quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in Frame Memory 42. In the encoder shown for purposes of illustration, this second output 131 goes through an inverse quantization 29 and an inverse discrete cosine transform 31 to return a lossy version of the difference macroblock. This data is summed with the output of the Motion Compensation unit 41 and returns a lossy version of the original picture (i.e., reconstructed current MB data 101) to the Frame Memory 42.

Figure 2:
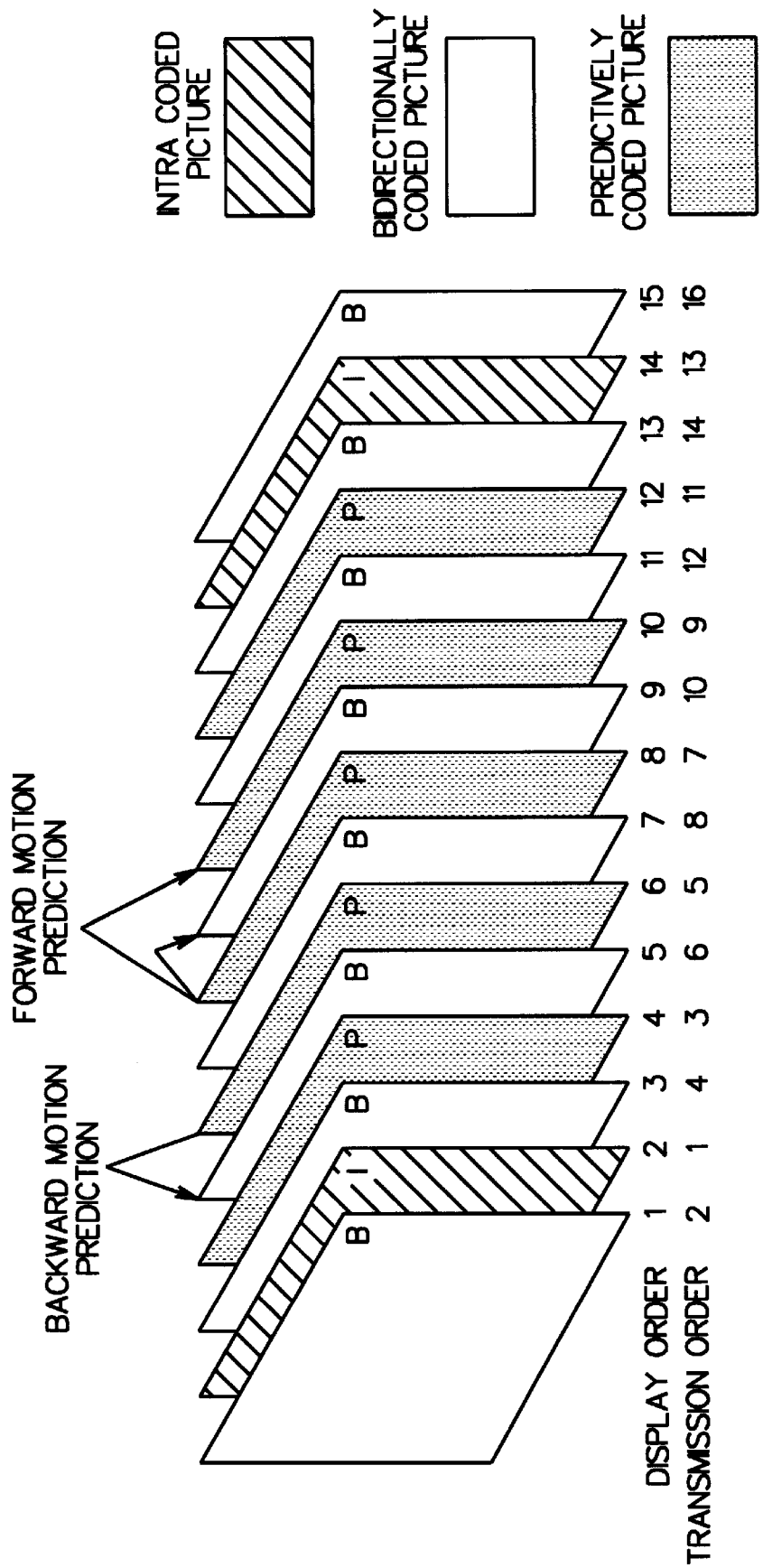
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a source of motion vectors. There are "Predicted pictures" or "P" pictures which are formed by motion vectors from a previous picture and can serve as a source of motion vectors for further pictures. Finally, there are "Bidirectional pictures" or "B" pictures which are formed by motion vectors from two other pictures, one past and one future, and can not serve as a source of motion vectors. Motion vectors are generated from "I" and "P" pictures, and are used to form "P" and "B" pictures. "P" and "B" pictures are also referred to as "Nonintra" or "Inter" pictures.

Figure 3:
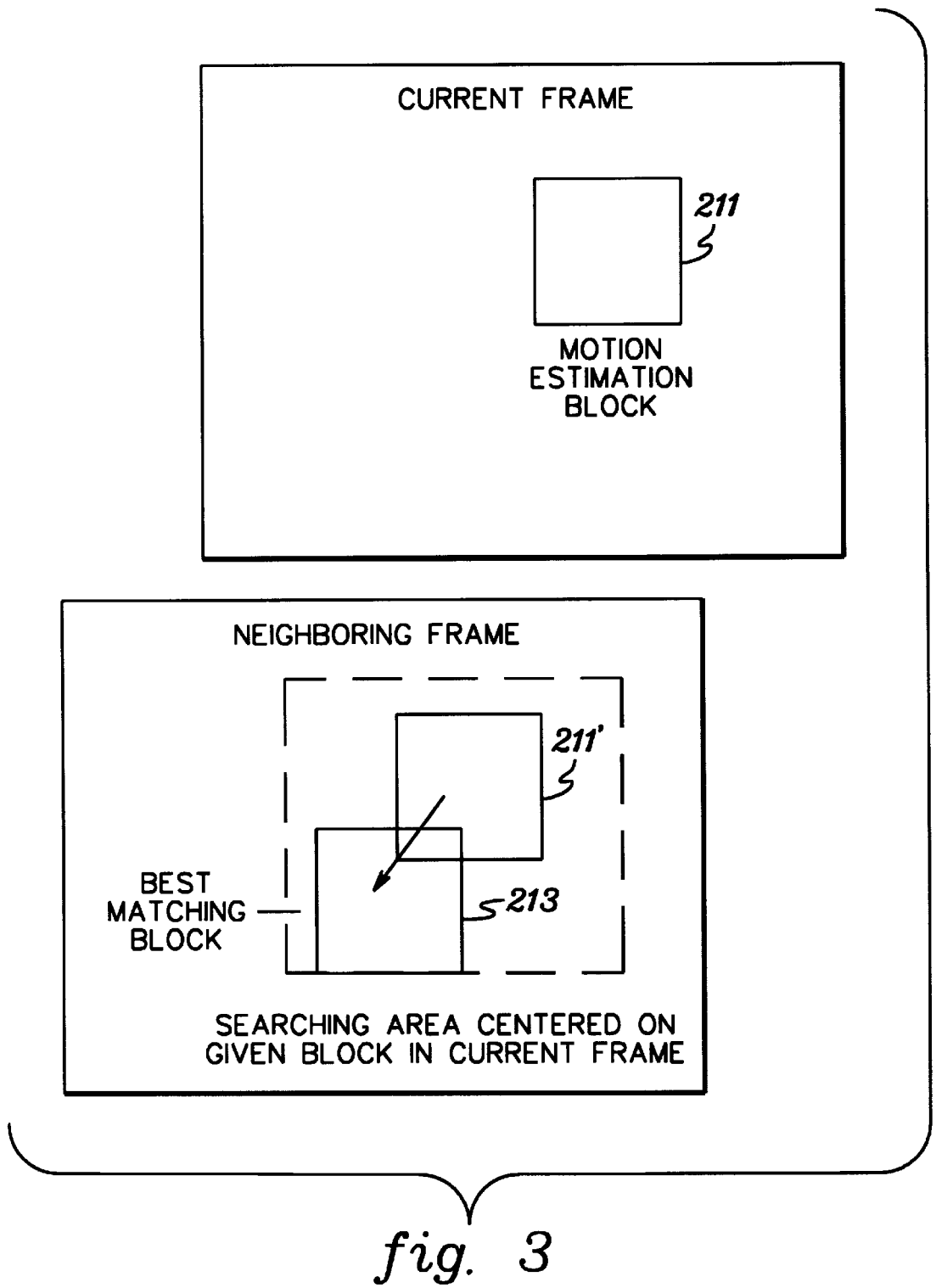
FIG. 3 illustrates the search from the motion estimation block in the current frame or picture to the best matching block in a subsequent or previous frame or picture. Elements 211 and 211' represent the same location in both pictures.
Figure 4:
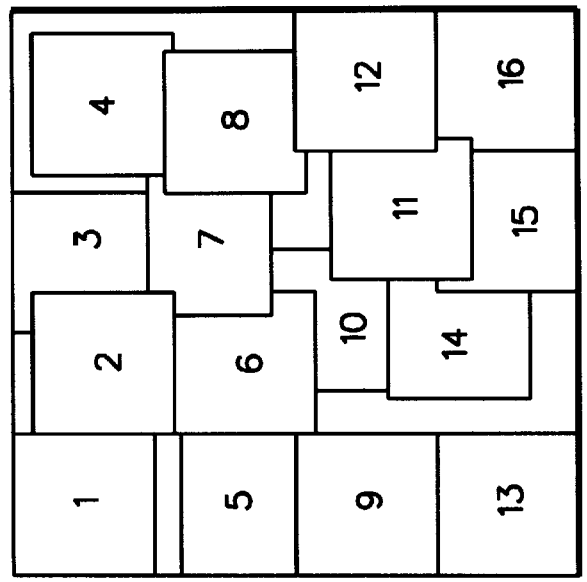
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213 to the macroblock 211. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, we look for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG2 encoder are implemented in three basic devices: an I or Intra device, an R or Reconstruction or Reference device, and an S or Search device. The functions are partitioned according to application needs, silicon size, tools and design complexity, and performance.

Figure 5:
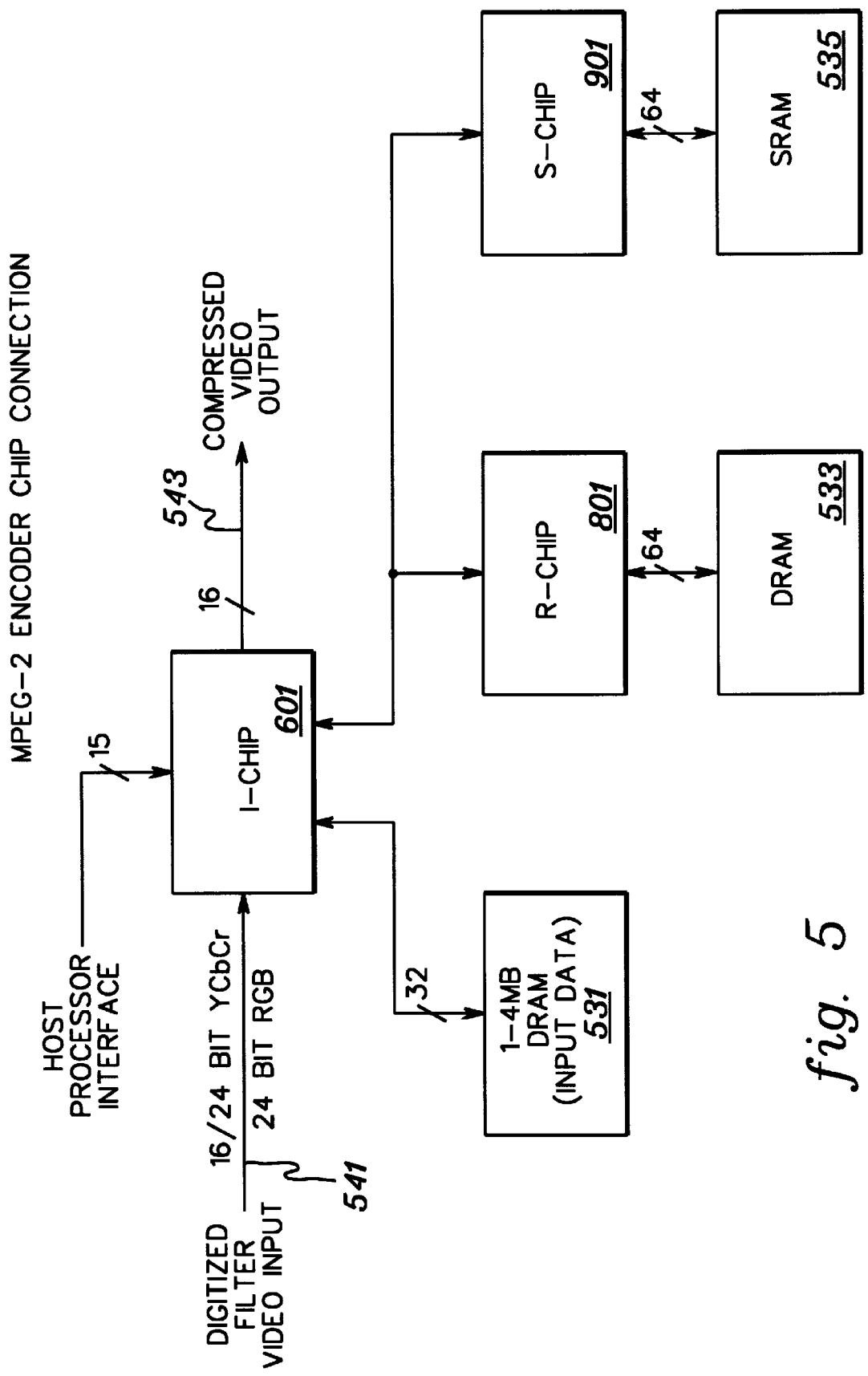
FIG. 5 shows the combination of three encoder chips of the invention. These are the Intra-chip or Intra-processor 601, the Reference-chip or Reference-processor 801, also referred to equivalently herein as a Reconstruction-chip or Reconstruction-processor 801, the Search-chip or Search-processor 901, and associated RAM chips 531, 533, and 535, including DRAM chips and SRAM chips. The Intra-chip or Intra-processor contains the host processor interface, it receives digitized filtered video input 541, and it produces a compressed video output 543.
Figure 6:
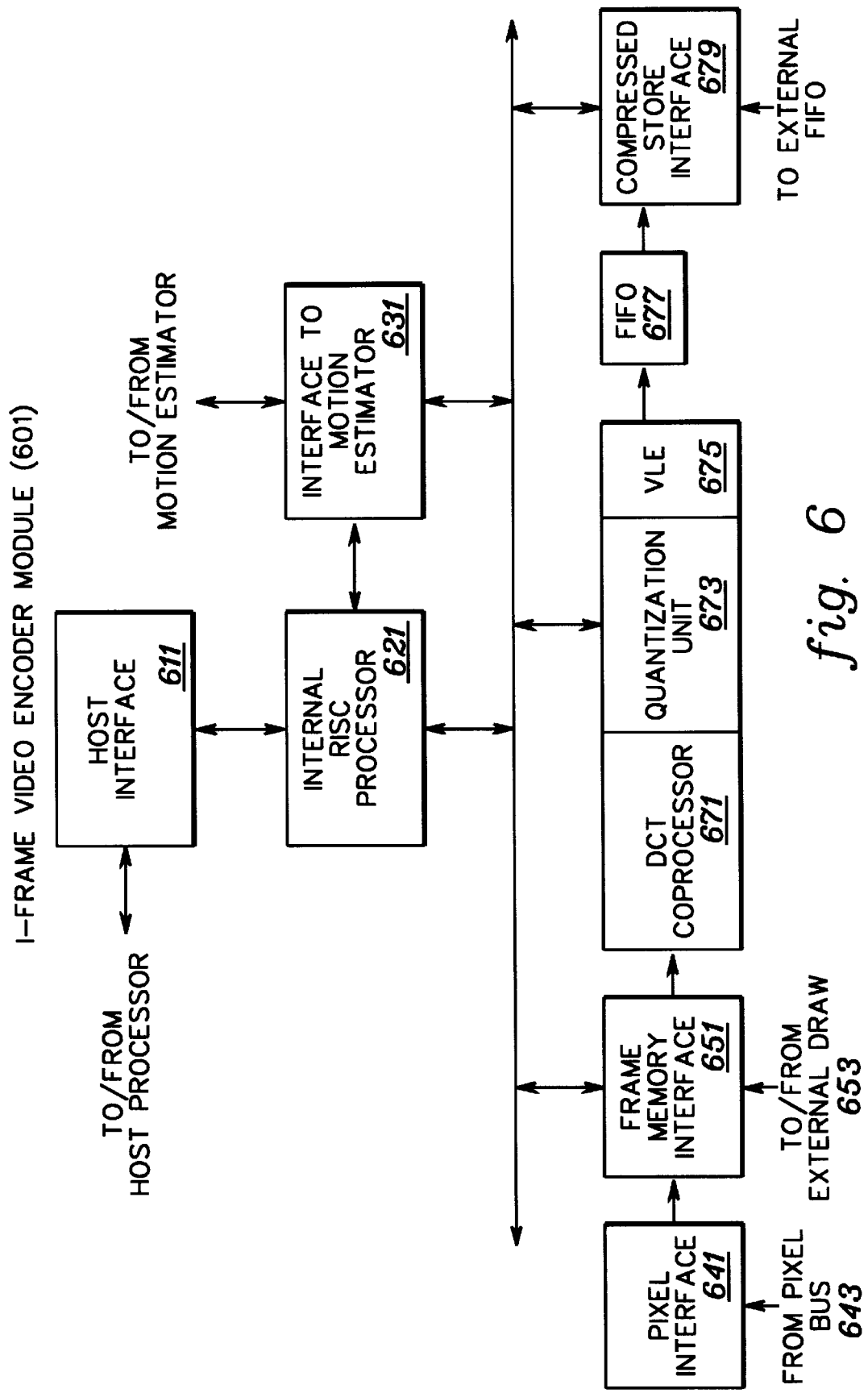
FIG. 6 shows an I-frame video encoder module 601 with a host interface 611, an internal RISC processor 621, an interface to motion estimation means 631, a pixel interface 641 for receiving pixel data from a pixel bus 643, a frame memory interface 651 receiving frame data from and sending frame data to an external RAM 653, a Discrete Cosine Transform (DCT) processor 671, a quantization unit 673, a variable length encoder 675, a FIFO buffer 677, and a compressed store interface 679.

As shown in FIG. 6 all external communications including pixel interface 641, host interface 611, and output data interface 679 are done in a single I device 601. The I device 601 is the master interface of the encoder, and is a basic requirement in any video compression application using the chip set of the invention, as shown in FIG. 5. A programmable processor 621 along with the entropy coding functions, that is the Discrete Cosine Transform processor unit 671, the quantization unit 673, and the variable length encoder unit 675, are incorporated in this chip. As a result, this device could be used in an application requiring encoding of I-only pictures. A reconstructed interface is also added to allow functional expansions. The processing functions applied prior to encoding are also included in this device.

Reconstructive processing of the macroblock is needed for all non I-picture coding, that is P picture and B picture encoding. Functions such as Inverse Discrete Cosine Transformation (IDCT), Inverse Quantization (IQ), and Motion Compensation (MC) are consolidated in a single chip, the R chip or R processor, 801 (FIG. 5). The R chip or R processor is also referred to as the Reconstruction chip. A small motion estimation function capability with a programmable processor is also added to handle low motion applications. A search result interface is installed for higher motion applications. As a result, the I and R-chips together could be used in applications with less motion such as distance learning, video conferencing, surveillance, etc.

Motion estimation is a repetitive function and has high computational requirements. A hardware device, the Search-chip or processor 901 (FIG. 5) with external programmable registers, is dedicated to this function. An expansion interface is installed to attain a larger search range. The three chip configuration can be used for applications like broadcast transmission, and the like. For higher motion, such as high speed photographic scientific applications, additional S chips 901 provide higher picture quality with a larger search range. This is a scalable feature of the architecture.

Chip Partition

The connections of the three encoder chips are shown in FIG. 5. FIG. 5 shows the combination of three encoder chips of processor elements. These are the Intra-chip or Intra-processor 601, the Reference-chip or Reference-processor 801, the Search-chip or Search-processor 901, and associated RAM chips 531, 533, and 535, including DRAM chips and SRAM chips. The Intra-chip or Intra-processor is the host processor interface, it receives digitized filtered video input 541, and it produces a compressed video output 543.

I-chip

The I-chip 601, shown in FIG. 6, handles the input data 541 (FIG. 5) and output bitstream 543 (FIG. 5) of the encoder system. Incoming pixel data is stored in frame format in an external DRAM, referred to as a frame store. This chip performs the core functions necessary for I frame encoding. Pixel data is converted from the RGB format to the YCbCr format, if needed. Pixel data is monitored for scene changes and for repeat fields created by 3:2 pulldown. Incoming pixel data is also adjusted to create HHR output format. The encoder can receive field or frame input format and output field or frame encoded data, regardless of how it was input. Input 4:2:2 data can be encoded as 4:2:2 or 4:2:0 output. The on-chip RISC processor 621 is responsible for adaptive DCT, adaptive quantization, and rate control. The processor has a dynamically partitionable structure that allows it to operate as a 4 byte engine or four 1 byte engines. This is described in commonly assigned, copending U.S. application Ser. No. 08/411,239 filed Mar. 27, 1995 by Charles Boice, John M. Kaczmarczyk, Agnes Ngai, and Robert C. Woodard for DYNAMICALLY PARTITIONABLE DIGITAL VIDEO PROCESSOR, the entirety of which is incorporated herein by reference.

The encoded macroblock is merged with header information as described in commonly assigned U.S. Pat. No. 5,526,054 by James D. Greenfield, Diane M. Mauersberg, and Agnes Ngai, for APPARATUS FOR HEADER GENERATION, the entirety of which is hereby incorporated herein by reference. This creates the final MPEG-2 or MPEG-1 output bitstream which the encoder can store to an external DRAM or ship to a FIFO, for example, through compressed store interface 679. When the picture is stored to DRAM it can be read out by the user through the host interface in non-real time.

R-chip or Processor

The R chip or processor 801, also referred to as the Refinement chip or the Reconstruction chip, is responsible for search motion estimation refinement and reconstruction of pictures for motion compensation. External DRAM is used to support the motion estimation function. The R chip or processor functional unit performs all the base functions required for reconstruction of pictures and motion estimation, including calculating and processing for the frame differences.

The primary functions of the processor are macroblock type decisions, adjusting search range per picture, and motion estimation assists. Both quantizer data and Search chip search results are received through a common chip interface. Quantized data is then dequantized using up to four matrix tables. The IDCT converts the coefficients to pixel data via a two dimensional inverse transform. This reconstructed picture data is saved as reference data by the memory interface for subsequent picture coding. The motion estimation can support field, frame dual prime, bidirectional motion types to half pel resolution along with I, P and B pictures.

The two chip configuration (Intra- & Refinement/Reconstruction-chips) can support up to +/−8H and +/−7V search range and the 3 chip configuration (Intra-, Refinement/Reconstruction, & Search chips) can support up to +/−64H and +/−56V. As motion estimation results are needed, the search window size and best match results are determined, and frame difference data is generated.

Search-chip or Processor

The Search-chip or processor 901 is responsible for the bulk of the motion estimation. The purpose of motion estimation is to find the location of a macroblock from the current picture (current picture macroblock or "CMB") in the reference picture. This location is determined by finding the best match, which is determined by comparing the CMB data to the reference pictures data and factoring in a bias which is based on the motion of previous pictures.

The entire reference picture cannot be searched in real time. Therefore, a subset of the reference picture is searched. This subset is called the Search Window. See FIG. 3. The larger the search window, the higher the chance of finding an exact match for the CMB. The search window can be significantly increased by employing additional Search-chips. Effective motion estimation produces higher quality video and highly compressed bit streams. The Search-processor receives the search window parameters from the processor on the Refinement/Reconstruction-processor and receives luminance picture data in either frame or field format from the Intra-chip, based on the picture structure.

The reference pictures are stored in off-chip SRAM in frame format. The motion estimation unit performs field searches on the CMB and the reference picture. Four field results are calculated along with a frame result for frame structured pictures. The results are in the form of difference data and are biased based on previous pictures motion characteristics. The biased difference data along with motion vectors are sent to the R-chip or processor 801, e.g., for calculation of the frame difference.

Processing flow

The I-chip or processor 601 contains both the pre-processing and entropy coding functions. The pre-processing functions are performed prior to any coding functions. The entropy coding is the last portion of picture processing. Its block diagram is shown in FIG. 6.

The present invention is related to the entropy coding functions of the I-chip or processor 601. Further discussion of the I-chip, R-chip and S-chip is provided in commonly assigned, pending U.S. patent application Ser. No. 08/831,157, by Carr et al., filed Apr. 1, 1997, entitled "CONTROL SCHEME FOR SHARED-USE DUAL-PORT PREDICTED ERROR ARRAY", which is incorporated herein in its entirety.

Figure 7:
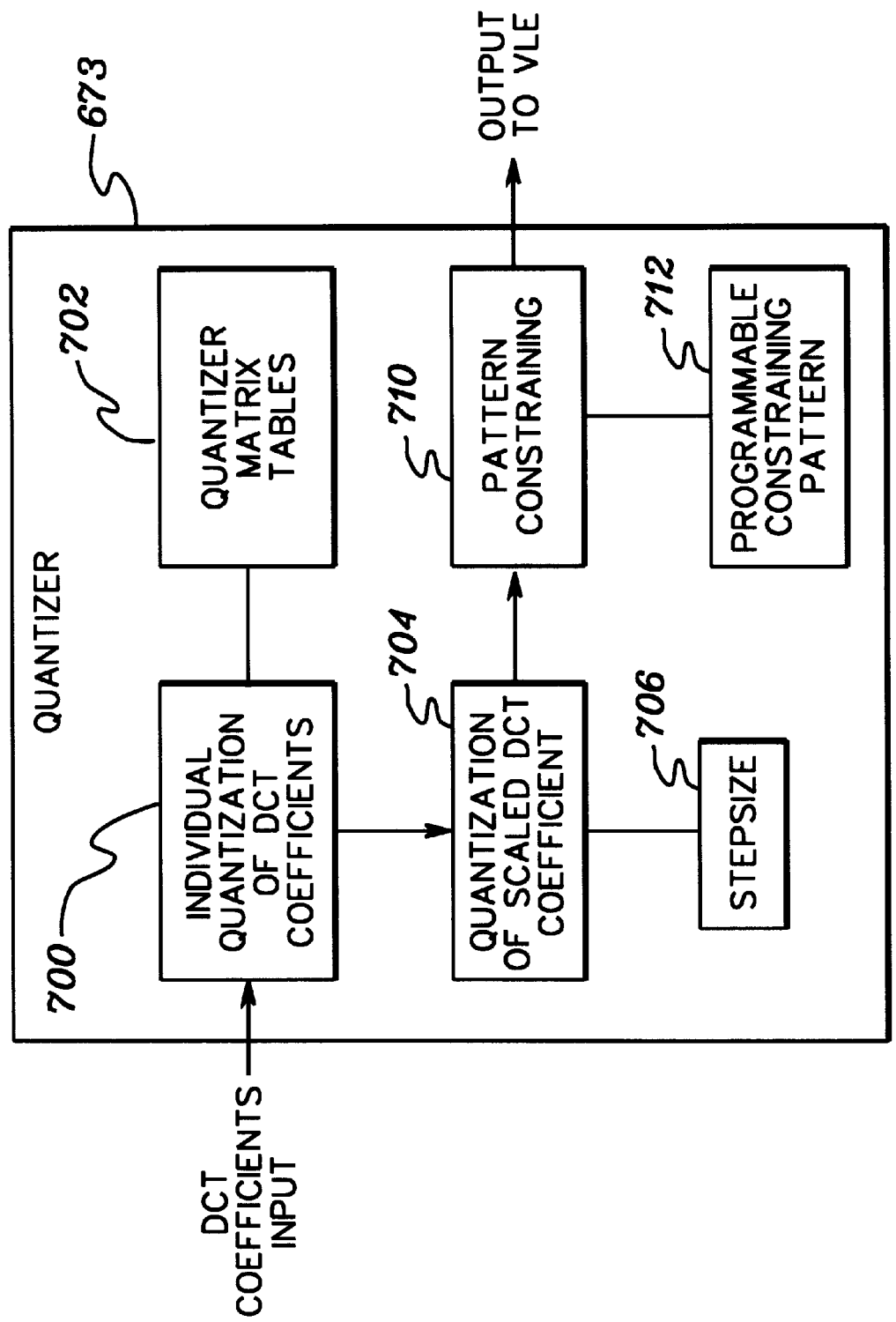
FIG. 7 depicts one embodiment of a quantization unit or quantizer 673 employing pattern constraining in accordance with the present invention.

Bit regulation in accordance with one aspect of the present invention can be implemented within quantization unit or quantizer 673, a more detailed embodiment of which is depicted in FIG. 7. In this aspect of the invention, applicants employ macroblock pattern constraining as a mechanism to achieve bit rate regulation. By selectively constraining coefficients in the blocks comprising a macroblock based on a predetermined, programmable constrain pattern, an optimal bit rate and picture quality balancing can be achieved. Preferably, the constrain pattern is selected to zero out high frequency coefficients in the macroblock, and thereby allow more bits to be allocated for low frequency coefficients. This achieves a finer mquant for use in capturing more picture detail.

By using host writes to the encoder, a user can program a desired constrain pattern. For example, the user can set the constrain pattern to constrain one-third, one-half or two-thirds of the coefficients in a macroblock, preferably in a diagonal pattern as discussed below in connection with FIGS. 9–12. The selected pattern can be applied to all macroblocks or to just nonintra macroblocks.

The quantization unit or quantizer 673 is responsible for quantizing the DCT coefficients from DCT coprocessor 671 (FIG. 6) and then sending the coefficients to variable length encoder (VLE) 675 (FIG. 6). Quantization involves scaling the DCT coefficients in a two-step process per MPEG Standard. The DCT coefficients are input initially to an Individual Quantization of DCT Coefficients logic block 700, which quantizes each coefficient based on its relative location within the subject block of the macroblock. This quantization is made with reference to weight values stored in Quantizer Matrix Tables 702 in the quantizer unit 673. The quantizer processes one block of a macroblock at a time. Again, there are six blocks in a 4:2:0 macroblock and eight blocks in a 4:2:2 macroblock. Thus, this first step is a quantization of each coefficient based on its relative location in the 8×8 block of the 16×16 macroblock.

The second quantization step is scaling all coefficients in the macroblock. This Quantization of Scaled DCT Coefficient 704 comprises an overall quantization which is set by the processor in consideration, for example, of the bit rate. This scaling is made with reference to a selected step size or mquant 706. The stepsize can be adjusted depending upon whether the bit rate is above or below a target bit rate.

Pursuant to the present invention, quantization unit 673 is modified to include Pattern Constraining logic 710 which accesses one or more Programmable Constraining Patterns 712. The decision whether to constrain can be based on bit rate of the macroblock or based on whether two prior macroblocks in a row exceeded a bit rate limit, with constraining being initiated for all subsequent macroblocks in the row. The user interface can direct which programmable constraining pattern of a plurality of programmable constraining patterns is to be applied once pattern constraining is set for a macroblock. Various desired patterns are discussed further below with reference to FIGS. 9–12.

Figure 8:
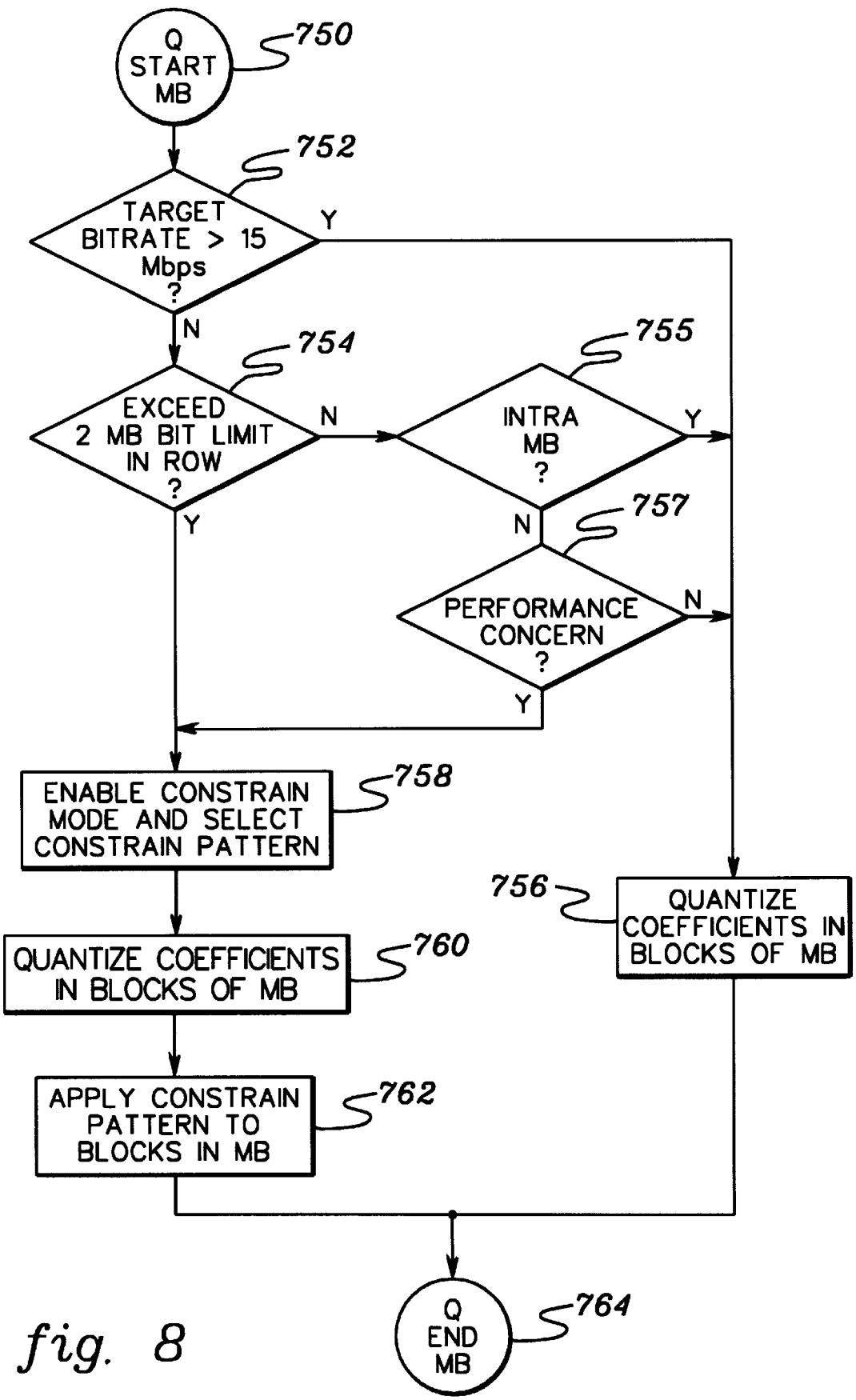
FIG. 8 shows a flowchart for pattern constraining processing implemented in accordance with the present invention.

FIG. 8 depicts one process flow for pattern constraining within quantizer 673 in accordance with the present invention. The flow is repeated for processing of each macroblock of a picture 750. An initial inquiry determines whether the target bit rate is greater than a predetermined number (x) of megabits per second (Mbps), e.g. 15 Mbps, 752. Assuming that the bit rate is greater than the predetermined Mbps, then the coefficients of each block of the macroblock are quantized 756 in accordance with the conventional quantization processing discussed above.

If the bit rate is less than the predetermined Mbps, then processing inquires whether the bit rate limit has already been exceeded by a preselected number n of macroblocks in the corresponding row of the picture 754. In this example, the preselected number comprises two macroblocks, which is an MPEG standard, after which macroblocks in that row shall be constrained to prevent exceeding the bit rate limit for the macroblocks. If the bit rate limit has been exceeded by two prior macroblocks in the row then the constrain mode is enabled and a partial constraining pattern is selected 758.

If the bit rate limit has not been exceeded by two prior macroblocks in the row but the macroblocks are nonintra macroblocks 755 and there are performance concerns 757, then the constrain mode is enabled and a partial constraining pattern is selected 758. In the constraining mode, the coefficients in the blocks of the macroblock are conventionally quantized through the first and second steps of the quantization unit 760, and the selected constraining pattern is then applied to the blocks of the macroblock. The resultant, partially constrained blocks are output to the variable length encoder (VLE) (FIG. 6). Upon output of all the blocks in a macroblock, quantization is complete for the macroblock 764.

Various constrain patterns are possible. In one preferred embodiment, constraining pursuant to this invention zeros high frequency coefficients in the individual blocks of a macroblock, while retaining lower frequency coefficients.

Since the lower frequency coefficients conventionally reside in the upper left portion of each block of coefficients, one preferred constraining pattern would be a diagonal pattern as depicted in FIG. 9. With this pattern, the 'AC' and 'DC' coefficients in the upper left portion of the 8×8 array of coefficients are retained, while those in the lower right portion are clipped or zeroed out.

As a further enhancement, the constraining pattern can be programmed or selected based, for example, upon an actual bit rate. In FIG. 10, the standard constraining pattern of FIG. 9 for a block of coefficients is shown with a diagonal line extending approximately through the middle of the coefficients array. This line separates the maintained coefficients from the clipped coefficients. An alternate constraining pattern is depicted in FIG. 11 for higher bit rates where less constraining is needed, while another alternate pattern is shown in FIG. 12 for lower bit rates where greater constraining is desired. Thus, by moving the diagonal line separating the constrained and unconstrained coefficients, a programmable constrain pattern can be achieved.

By way of specific example, the standard constraining pattern of FIG. 10 might be used for an average bit rate in the range of 15–30 Mbps, while the higher bit rate constraining pattern could be employed for 30–50 Mbps and lower bit rate constraining pattern for less than 15 Mbps. Those skilled in the art can readily implement additional constrain patterns in accordance with the teachings of this disclosure. The claims appended herewith are intended to encompass the concept of selectively constraining a portion of the coefficients in the blocks of a macroblock irrespective of the particular constraining pattern employed.

Another bit regulation concept in accordance with the present invention is discussed below with reference to FIGS. 13–15. This concept involves the Coded Block Pattern (CBP) which is output by MPEG standard as part of the bitstream from the encoder for each nonintra macroblock. The Coded block Pattern is a binary number (6 bits for 4:2:0 format and 8 bits for 4:2:2 format) which defines which blocks in a given macroblock are coded, i.e., which blocks contain at least one nonzero coefficient. For example, the 4:2:0 pattern number is equal to 32*P1+16*P2+8*P3+4*P4+2*P5+1P6, where Pn is 1 if any coefficient is present in block n, otherwise 0. For intra macroblocks, all blocks must be coded, and therefore a Coded Block Pattern is not needed or used. The CBP is needed only for nonintra macroblocks.

This aspect of bit regulation pursuant to the invention is based on a recognition that if a Coded Block Pattern can be determined before the coefficients of a current macroblock are encoded, the compressed store interface 679 (FIG. 6) would not need to buffer the coefficients. Thus, the present invention "fixes" the Coded Block Pattern to produce a Fixed Coded Block Pattern (herein FCBP) which indicates that all blocks in the nonintra macroblock are coded. Once this is done, the encoder then guarantees that each block is coded (i.e., contains at least one nonzero coefficient). In the case where a block contains all zeros, the encoder is directed to encode a "1" in the $64^{th}$ coefficient location to make the block coefficient data match the FCBP which had already been placed in the bitstream. Performance is enhanced with this scheme by eliminating the need for the compressed store interface to await processing of all blocks of a nonintra macroblock before outputting the macroblock header.

Figure 13:
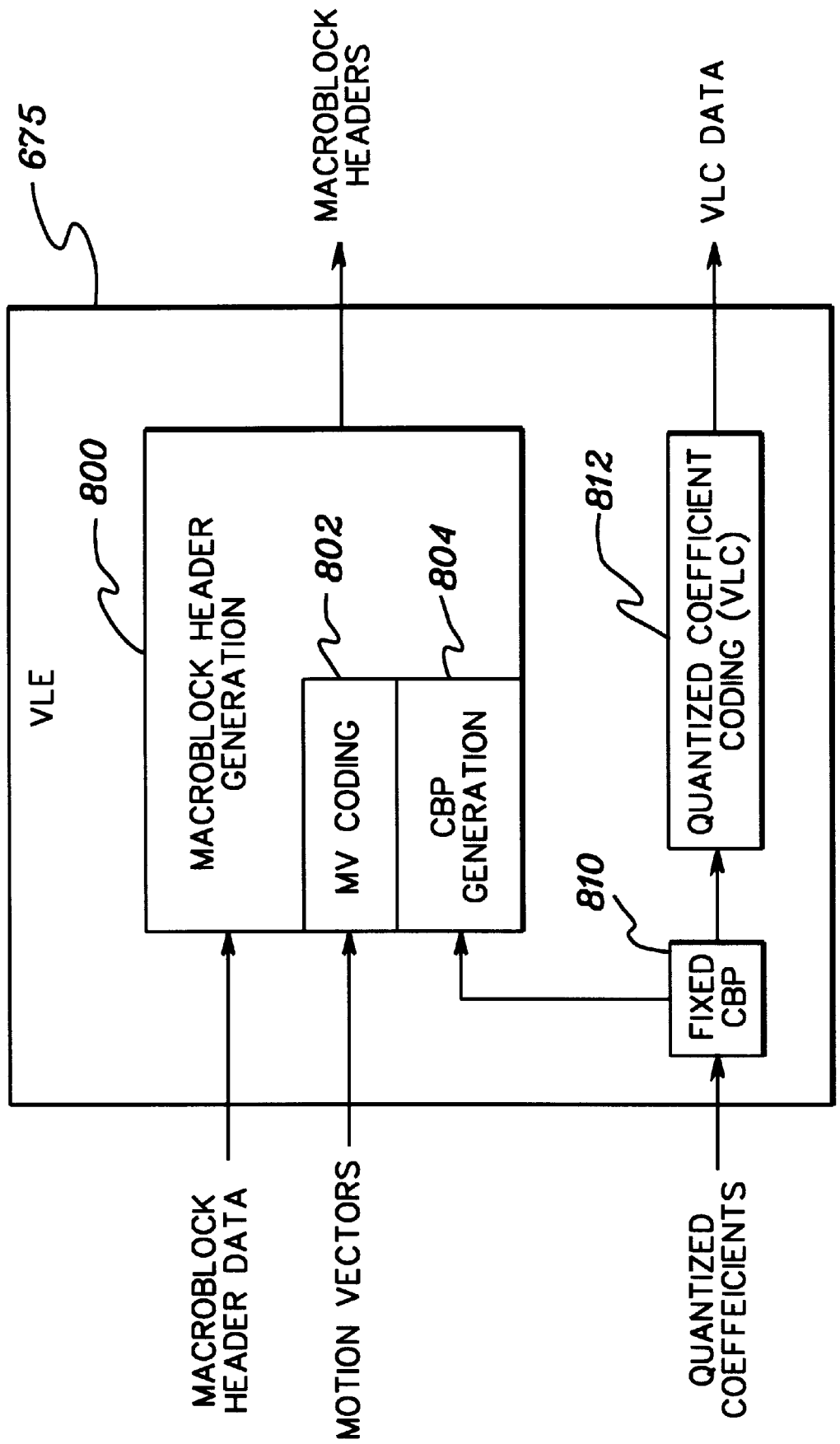
FIG. 13 depicts one embodiment of a variable length encoder 675 employing a fixed coded block pattern mode in accordance with the present invention.

Referring to FIG. 13, the main function of VLE 675 is to encode transformed and quantized pixel data using techniques defined by the MPEG standard. In addition to this main function, the VLE also determines and encodes certain macroblock parameters which are used in the macroblock headers. One of these parameters is the above-described Coded Block Pattern. Macroblock header generation hardware and/or software 800 receives as input macroblock header data and motion vectors. Motion vector coding 802 and coded block pattern generation 804 are employed to produce the macroblock headers which must precede the macroblock in the bitstream output from the compressed store interface 679 (FIG. 6).

In accordance with the present invention, the quantized coefficients from the quantization unit 673 are initially received at a Fixed Coded Block Pattern mode interface 810. This interface is where determination is made whether a coefficient in a block of a nonintra macroblock needs to be converted to a nonzero value. For example, the $64^{th}$ coefficient in an all zeros block can be converted in accordance with the present invention to a 1 as shown in FIG. 15. Assuming Fixed Coded Block Pattern (FCBP) mode, a signal is sent to CBP generation 804 to output an all 1's (or FCBP) header presently, i.e., before processing of the blocks of the macroblock. Once the FCBP mode is determined and the header is sent, the quantized coefficients are forwarded for variable length coding 812 and output as variable length coded data. The concepts presented herein for modifying an all zeroes block to include at least one nonzero coefficient, for example, in the $64^{th}$ position, can be implemented within quantized coefficient coding block 812.

Figure 14:
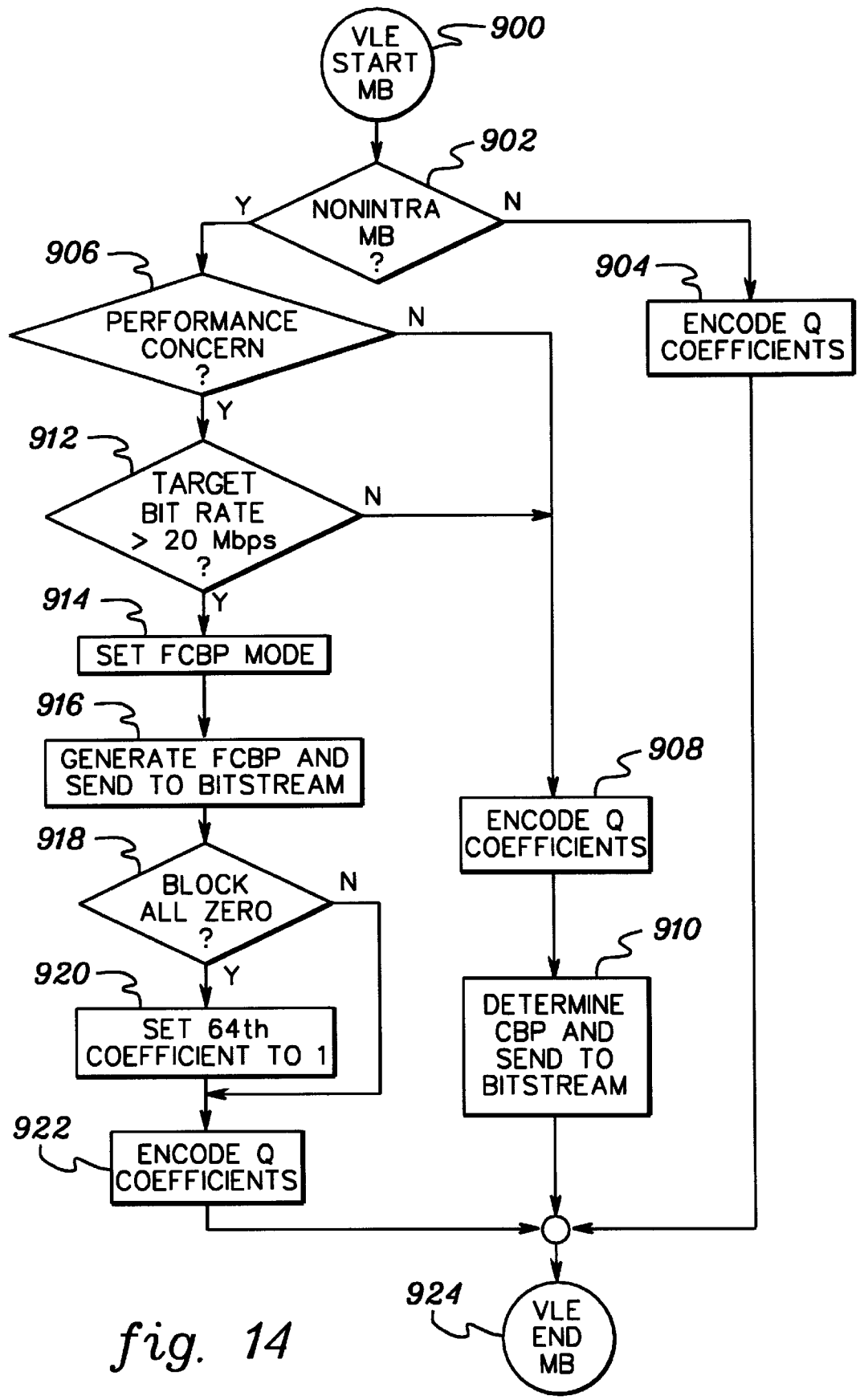
FIG. 14 shows a flowchart for processing implemented by the variable length encoder of FIG. 13.

FIG. 14 presents one Fixed Coded Block Pattern processing embodiment in accordance with the present invention. Variable length encoding of a macroblock begins 900 with determination of whether the macroblock comprises a nonintra macroblock 902. If the macroblock comprises an intra macroblock, then the FCBP is unnecessary and the quantized coefficients are encoded 904. Variable length encoding of the macroblock is then complete 924.

Assuming that the macroblock comprises a nonintra macroblock, processing can next (optionally) determine whether data is being processed with a performance concern 906. If no, then the performance enhancements obtained with this aspect of the invention are unnecessary and the quantized coefficients are variable length encoded 908 and the conventional Coded Block Pattern is determined and sent for output in the bitstream 910 in accordance with convention VLC defined by MPEG standards. The variable length encoding of the macroblock is then complete 924. If in performance concern mode, or if the inquiry is omitted, processing is directed from inquiry 906 to determine whether the target bit rate is greater than a predetermined rate, for example, 20 Mbps 912 and if yes, the fixed coded block pattern (FCBP) mode is set 914. If the target bit rate is less than the predetermined rate, then there is no need for performance enhancement in accordance with this aspect of the invention and processing is directed to the encoding 908 and determining 910 steps noted above.

If, on the other hand, the bit rate is greater than the predetermined bit rate, then after setting the mode 914, the FCBP header is generated, i.e., an all 1's coded block pattern is produced and sent to the bit stream 916. Each block of the macroblock is then examined to determine whether the block has all zeros 918. If no, then the quantized coefficients of the block are variable length coded (VLC) 922. In accordance with this aspect of the invention, if the block contains all zeros, then one of the coefficients, for example, the $64^{th}$ coefficient, is set to a nonzero value, e.g., "1" 920. The block is then VLC encoded 922. Process steps 918, 920–922 are repeated for each block of the macroblock until macroblock processing is complete 924.

At higher bit rates, the processing of FIG. 14 works well since the likelihood of having blocks that are not coded is relatively small. At lower bit rates, however, the likelihood of uncoded blocks is much greater. Therefore, it may be desirable to combine the FCBP processings described above with the pattern constraining process also discussed above. By employing constraining, the amount of data per block may be reduced by zeroing out the higher frequency coefficients of each block, thus reducing the overall size of the macroblock. This in turn would mean that the amount of data that the compressed store interface would need to buffer for subsequent readout is reduced. This does not alleviate the need for the compressed store interface buffering nonintra macroblocks, but it does help alleviate the problem and improve performance, i.e., for bit rates below the predetermined bit rate, for example, 20 Mbps.

To restate, presented herein are several macroblock bit regulation schemes which can be used to enhance quantization and variable length encoding of the video encoder. By selectively, partially constraining coefficients in a macroblock, bit rate regulation is achieved and an improved balancing of bit rate and picture quality is obtained. For example, setting a constrain pattern to zero out high frequency coefficients, allows more bits to be allocated for the low frequency coefficients. A finer mquant can then be used to capture more picture details. Pattern constraining can be applied to all macroblocks or to only nonintra macroblocks. A wide range of partial constrain patterns are possible.

Performance can also be enhanced by fixing (predetermining) the Coded Block Pattern defined by MPEG standard as output from the variable length encoder. By predetermining the Coded Block Pattern an entire macroblock's worth of variable length encoded data need not be buffered at the compressed store interface. This works particularly well at higher bit rates since the likelihood of having blocks that are not coded is small.

In the case of low bit rate macroblocks, pattern constraining reduces the overall size of the macroblock, and therefore the amount of data that the compressed store interface would need to buffer and subsequently read out is also reduced. This would not eliminate the need for the compressed store interface to buffer nonintra macroblocks with low bit rate, but it does improve performance.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for encoding a picture having a plurality of macroblocks, each macroblock containing coefficients, said method comprising for each macroblock:
    encoding the coefficients of the macroblock;
    determining a target bit rate for the macroblock;
    if the target bit rate is less than x meqabits per second (Mbps), wherein x is a predetermined number, applying a constraining pattern to the coefficients, said constraining pattern zeroing selected coefficients of the macroblock; and
wherein the coefficients of each macroblock are arranged in blocks, and wherein said method further comprises determining if the picture comprises a nonintra picture, and if so, then for each macroblock:
    generating a Fixed Coded Block Pattern (FCBP) header for the macroblock and outputting the FCBP in a bitstream, said FCBP signifying that each block of the macroblock contains at least one nonzero coefficient; and
    ensuring that each block of the macroblock contains at least one nonzero coefficient.

2. The method of claim 1, wherein said applying of the constraining pattern to the macroblock comprises zeroing selected high frequency coefficients of the macroblock, while maintaining lower frequency coefficients of the macroblock.

3. The method of claim 1, further comprising selecting the constraining pattern applied to the macroblock from multiple constraining patterns.

4. The method of claim 1, wherein said encoding comprises quantizing the coefficients of the macroblock, said quantizing occurring either before or after said applying of the constraining pattern to the macroblock.

5. The method of claim 1, wherein said ensuring comprises identifying each block of the macroblock having all zeroes and setting one coefficient of each block having all zeroes to a nonzero value.

6. The method of claim 5, wherein each block of each macroblock comprises an 8×8 array of coefficients and wherein said setting comprises setting a $64^{th}$ coefficient of the 8×8 array of coefficients to '1'.

7. The method of claim 1, wherein said encoding further comprises variable length encoding coefficients of the macroblock if the target bit rate is less than x Mbps and thereafter determining a conventional Coded Block Pattern for the macroblock without performing said FCBP generating and said ensuring steps.

8. The method of claim 1, wherein if the target bit rate is greater than x Mbps, then performing said FCBP generating and said ensuring steps and variable length encoding coefficients of the macroblock after said ensuring that each block of the macroblock contains at least one nonzero coefficient.

9. A method for encoding a macroblock of a nonintra picture having a plurality of macroblocks, each macroblock containing coefficients arrayed in multiple blocks, said method comprising:
    generating a Fixed Coded Block Pattern (FCBP) header for the macroblock and outputting the FCBP in a bitstream, said FCBP signifying that each block of the macroblock contains at least one nonzero coefficient; and
    subsequently ensuring that each block of the macroblock contains at least one nonzero coefficient.

10. The method of claim 9, wherein said ensuring comprises identifying each block of the macroblock having all zeros, and setting one coefficient of each block having all zeros to a nonzero value.

11. The method of claim 10, wherein each block comprises an 8×8 array of coefficients, and wherein said setting comprises setting a $64^{th}$ coefficient of said 8×8 array of coefficients to said nonzero value, said nonzero value comprising a '1'.

12. The method of claim 9, further comprising determining whether a target bit rate of the macroblock exceeds x megabits per second (Mbps), wherein x=a predetermined number, and wherein said method further comprises performing said generating and said ensuring only if the target bit rate of the macroblock is greater than said x Mbps.

13. The method of claim 12, wherein if the target bit rate of the macroblock is less than x Mbps, then said method comprises variable length encoding said coefficients of said macroblock, and thereafter determining a conventional Coded Bit Pattern header from the blocks of the macroblock for output to the bitstream without performing said FCBP generating and said ensuring steps.

14. The method of claim 12, wherein if the target bit rate exceeds x Mbps, then said method further comprises variable length encoding said coefficients after ensuring that each block of the macroblock contains at least one nonzero coefficient.

15. The method of claim 12, wherein x=20 Mbps, and said method further comprises determining whether a nonperformance concern mode exists for said encoding of the nonintra picture, and if so, variable length encoding the coefficients of the macroblock, determining a conventional Coded Block Pattern (CBP) header for the macroblock and outputting the CBP header and variable length encoded coefficients in the bitstream without performing said FCBP generating and said ensuring steps.

16. The method of claim 9, further comprising performing said method for each macroblock of said plurality of macroblocks of the nonintra picture, and wherein said method further comprises initially determining whether a received picture comprises an intra picture or a nonintra picture, and performing said method only for said nonintra picture.

17. Apparatus for encoding a macroblock of a picture having a plurality of macroblocks, each macroblock containing coefficients, said apparatus comprising:

means for quantizing the coefficients of the macroblock;

pattern constraining logic responsive to said means for quantizing for applying a constraining pattern to the macroblock if a target bit rate of the macroblock is less than x megabits per second (Mbps), wherein x is a predetermined number, said constraining pattern zeroing selected coefficients of the macroblock to reduce the bit rate of the macroblock; and wherein the coefficients of each macroblock are arranged in blocks, said picture comprises a nonintra picture, and said apparatus further comprises:

means for generating a Fixed Coded Block Pattern (FCBP) header for the macroblock and for outputting the FCBP in a bitstream, said FCBP signifying that each block of the macroblock contains at least one nonzero coefficient; and responsive to said means for generating, means for subsequently ensuring that each block of the macroblock contains at least one nonzero coefficient.

18. The apparatus of claim 17, wherein said pattern constraining logic comprises means for applying said constraining pattern to zero selected high frequency coefficients of the macroblock, while retaining lower frequency coefficients of the macroblock.

19. The apparatus of claim 17, further comprising means for selecting the constraining pattern to be applied to the macroblock based upon the bit rate of the macroblock.

20. The apparatus of claim 19, wherein said means for selecting further comprises means for storing multiple predetermined constraining patterns and means for selecting the constraining pattern from said multiple predetermined constraining patterns.

21. The apparatus of claim 17, wherein said means for subsequently ensuring comprises means for identifying each block of the macroblock having all zeros and for setting one coefficient of each block having all zeros to a nonzero value.

22. The apparatus of claim 21, wherein each block of the macroblock comprises an 8×8 array of coefficients, and wherein said means for setting comprises means for setting a $64^{th}$ coefficient of the 8×8 array of coefficients to '1'.

23. The apparatus of claim 17, further comprising means for variable length encoding coefficients of the macroblock if the target bit rate of the macroblock is less than x Mbps and thereafter for determining a conventional Coded Block Pattern for the macroblock.

24. Apparatus for encoding a macroblock of a nonintra picture having a plurality of macroblocks, each macroblock containing coefficients arrayed in multiple blocks, said apparatus comprising:

means for generating a Fixed Coded Block Pattern (FCBP) header for the macroblock and for outputting the FCBP in a bitstream, said FCBP signifying that each block of the macroblock contains at least one nonzero coefficient; and means for ensuring that after outputting said FCBP each block of the macroblock contains at least one nonzero coefficient.

25. The apparatus of claim 24, wherein said means for ensuring comprises means for identifying each block of the macroblock having all zeros, and for setting one coefficient of each block having all zeros to a nonzero value.

26. The apparatus of claim 25, wherein each block comprises an 8×8 array of coefficients, and wherein said means for setting comprises means for setting a $64^{th}$ coefficient of said 8×8 array of coefficients to a nonzero value, said nonzero value comprising a '1'.

27. The apparatus of claim 24, further comprising means for determining whether a target bit rate of the macroblock exceeds x megabits per second (Mbps), wherein x=a predetermined number, said means for generating and said means for ensuring being responsive to said means for determining the target bit rate of the macroblock such that said FCBP is generated only if the target bit rate of the macroblock exceeds x Mbps.

28. The apparatus of claim 27, further comprising means for variable length encoding the coefficients of the macroblock if the target bit rate of the macroblock is less than x Mbps, and thereafter for determining a conventional Coded Bit Pattern header from the blocks of the macroblock.

29. The apparatus of claim 24, further comprising means for variable length encoding said coefficients of the macroblock after said means for ensuring ensures that each block of the macroblock contains at least one nonzero coefficient.

* * * * *